Sept. 6, 1966 F. F. OHNTRUP 3,270,399

METHOD OF FABRICATING SEMI-CONDUCTOR DEVICES

Filed April 24, 1962 3 Sheets-Sheet 1

INVENTOR.
FREDERICK F. OHNTRUP

BY Carl Fissell Jr.
AGENT

METHOD OF FABRICATING SEMI-CONDUCTOR DEVICES
Filed April 24, 1962
3 Sheets-Sheet 2
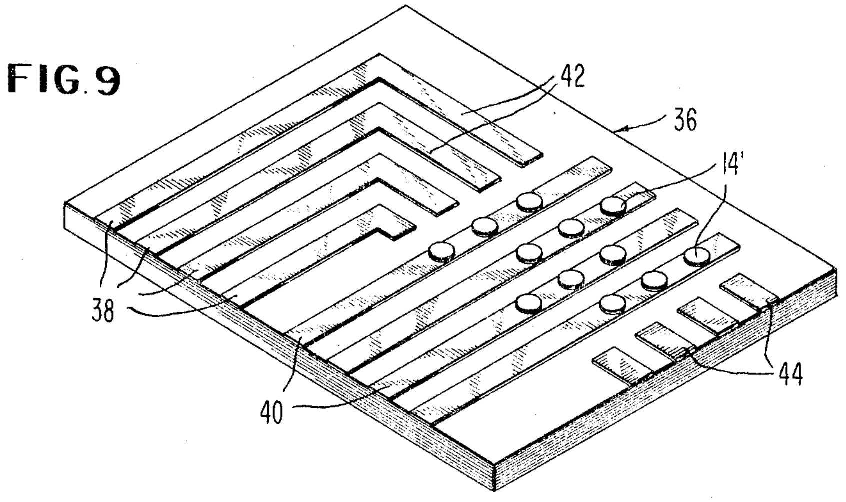
FIG. 9
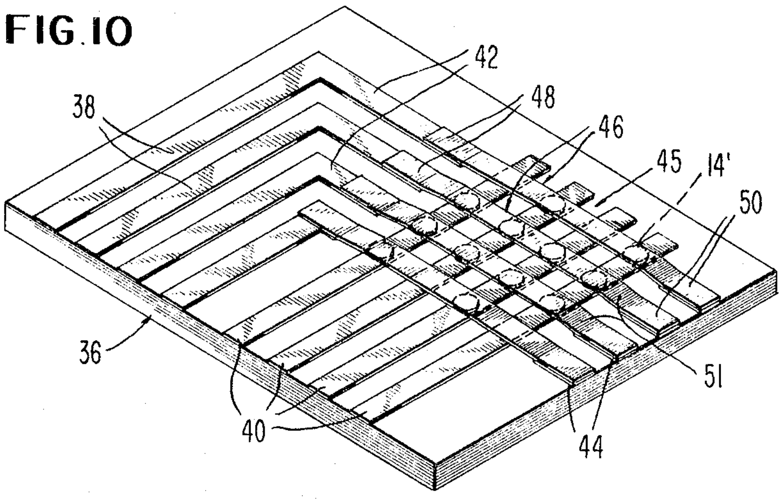
FIG. 10
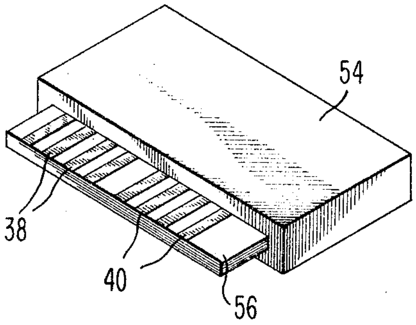
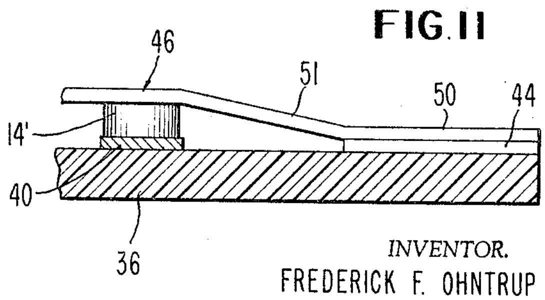
FIG. 11
FIG. 12
INVENTOR.
FREDERICK F. OHNTRUP
BY Carl Fissell Jr.
AGENT

METHOD OF FABRICATING SEMI-CONDUCTOR DEVICES

Filed April 24, 1962

3 Sheets-Sheet 3

INVENTOR.
FREDERICK F. OHNTRUP
BY Carl Fissell Jr.
AGENT

United States Patent Office 3,270,399
Patented Sept. 6, 1966

3,270,399
METHOD OF FABRICATING SEMI-CONDUCTOR DEVICES
Frederick F. Ohntrup, Plymouth Meeting, Pa., assignor to Burroughs Corporation, Detroit, Mich., a corporation of Michigan
Filed Apr. 24, 1962, Ser. No. 189,752
4 Claims. (Cl. 29—155.5)

The present invention relates to semi-conductor apparatus and more particularly to semi-conductor diode and/or transistor type apparatus and still more particularly, to a method of fabrication of such apparatus to form an array or matrix thereof and/or a utilization device such as an electronic circuit package module. With still more specificity, the invention has to do with the fabrication of electrical interconnecting conductors for diode matrices or transistor circuits and to the method of making connections to such semi-conductor devices in a manner to form a circuit array.

It is an important object of the present invention to provide an improved method of fabrication of electronic semi-conductor circuit components and/or circuits.

Another object of the invention is to provide a method of making electrical connections to semi-conductor circuit components eliminating the need for wrap-around connections or plated through hole techniques.

Still a further object of the invention is to provide a simple, easy and efficient method for etching, washing, potting and otherwise treating the various semi-conductor circuit components for assembling into an array.

Another object of the invention is to provide a novel miniaturized semi-conductor circuit component package of an open structure type thus to permit ease of access for the various chemicals used in the preparation and fabrication thereof.

In accordance with the foregoing objects and first briefly described, the present invention comprises a method of fabricating and assembling one or more semi-conductor circuit components into an electronic circuit assembly, such for example, as a matrix or array by bonding an open conductive grid of substantially flat electrical conductors to opposite sides of circuit oriented or arrayed semi-conductor elements in an orthogonal arrangement which assembly is thereafter etched, washed and potted in a dielectric material thereby to produce a miniaturized electronic circuit component assembly which is or may be pluggably mounted on a printed wiring circuit panel.

FIG. 9 is an isometric view of a diode array similar to that of FIG. 2 secured to a printed wiring panel;

FIG. 10 is a view similar to FIG. 9 showing the application of the orthogonal conductor grid to the diodes of FIG. 9;

FIG. 11 is a sectional view through one end of the array of FIG. 10;

FIG. 12 is an isometric view of a unitary electronic assembly produced by potting the apparatus of FIG. 10;

Semi-conductor devices generally may have multiple electrical conductive connections made thereto in the form of terminals or tabs which are or may be secured to additional supporting structure or may be directly tied or wired to other electrical circuit components or, in some cases, attached or secured directly to the utilization device with which the semi-conductor, e.g., diode or transistor, as the case may be, is to be operatively associated. If the circuit includes a diode, generally speaking, there are two terminals for attaching such component to the remainder of the electrical circuitry with which it is used. If a transistor or a hook collector type transistor is used it generally has three attachment terminals. The hook collector transistor is what is sometimes referred to as a four layer switch having three available terminals thereon. In the fabrication of the foregoing type of apparatus, the diodes or transistors have in the past been sandwiched between dielectric substrates such as glass or other similar dielectric material which, while offering a good supporting structure, nevertheless impedes the etching, washing, potting and other fabricating subassembly steps leading to the final electronic packaged assembly. Also, because of the types of materials involved and the fact that the package resulting therefrom is essentially a closed package, i.e., the top and bottom planes are solid rather than open to the atmosphere further handling requires that the material such as chemicals, baths, washes, etc. must reach the circuit elements from the edges of the assembly and in some cases this is either undesirable, impractical or impossible due to the small spaces involved. As a matter of fact, in some instances the by-products of the etching solutions prevent such solutions from reacting properly and adequately because of gasses that are expelled when the etchants react with the material from which the circuit components are fabricated. These and other problems are avoided as is hereinafter set forth.

Figure 1:
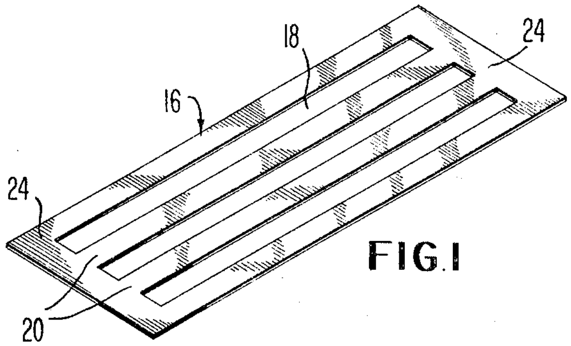
FIG. 1 is an isometric view of a conductor forming grid employed with the present invention.
Figure 2:
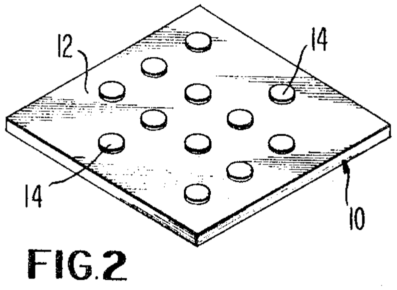
FIG. 2 is an isometric view of a diode circuit plate for the present invention.

Referring now to the drawings, and particularly to FIGS. 1 through 8, there is seen in FIG. 2 a semi-conductor array 10, which comprises a substrate assembly or circuit plate 12 of dielectric material such as glass or glass epoxy or other similar material, on which a plurality of semi-conductor diodes 14 of silicon or other similar semi-conductor material are attached as a result of a previous fabrication assembly step wherein for example, the diodes may have been produced as the result of an ultrasonic machining operation as is described and claimed in the copending application to Frederick F. Ohntrup, Serial No. 114,956, filed June 5, 1961 now Patent No. 3,187,606 and assigned to the assignee of the present invention. This arrangement, FIG. 2, is often referred to as a circuit transfer plate assembly.

In the present application a diffused silicon wafer, not shown, is machined ultrasonically thereby dividing it into separate diodes 14, twenty-two thousandths of an inch in diameter and spaced fifty thousandths of an inch center to center. The diodes are held in place on the transfer plate 12 by means of a suitable adhesive, not shown.

Figure 3:
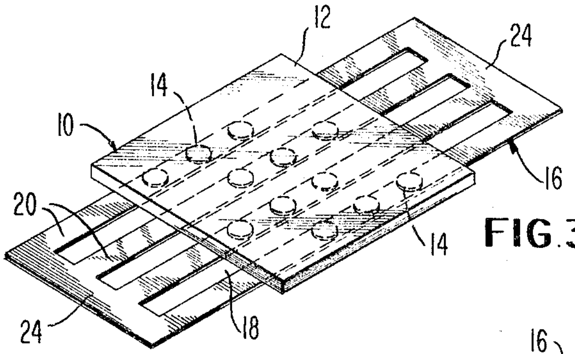
FIG. 3 is an isometric view of the circuit plate of FIG. 2 inverted and secured to the conductors of the grid of FIG. 1.
Figure 6:
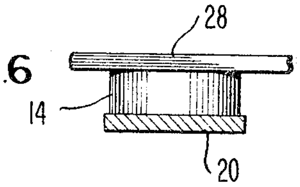
FIG. 6 is a partial sectional view of one end of the array of FIG. 5.
Figure 4:
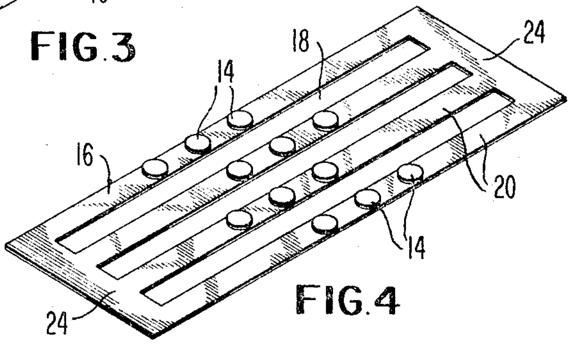
FIG. 4 illustrates the grid of FIG. 3 with the diodes bonded thereto and the supporting plate removed therefrom.

In order to produce electrical circuit connections and interconnections, in a desired pattern or array for the diodes in the particular assembly above referred to, a thin, flat sheet 16 of metal, FIG. 1, is etched, die cut, stamped or otherwise provided with a pattern of parallel conductors separated by open spaces similar to that shown in FIG. 1. The metal material is removed from the areas 18 which are shown clear in FIG. 1, e.g., in an etching bath if such techniques are used so as to provide a series of conductors 20 which are approximately twenty-five mils in width. The thickness of the grid as this may be called, is in the order of one and one-half thousandths of an inch. The material in the present instance is nickel. Other materials of course could be used as for example, brass, in which case the thickness might increase to approximately three thousandths of an inch. The metal sheet 16 is now given a copper flash followed by a one to two thousandths inch solder or tin plate. The diodes which are or may be secured to the circuit plate in accordance with the teaching of the copending application, Serial No. 124,258 filed June 5, 1961 in the name of Ralph Saunders, now Patent No. 3,158,927 entitled, "Method of Fabricating Sub-Miniature Semi-Conductor Matrix Apparatus," assigned to the assignee of this invention, are nickel plated on top and bottom exposed surfaces. Thereafter, as seen more particularly in FIG. 3, the diode circuit plate 12 is inverted and disposed over the grid in the relative position shown with the diodes oriented on the individual conductors 20. The end sections 24 of the metal plate 16 are permitted to remain for mechanical rigidity and stability during further handling. The assembly of FIG. 3 is next placed in a jig or hot-plate, not shown, whereby the diodes are soldered to the conductors of the grid at the places where the diodes are actually disposed on and in contact therewith. The resulting assembly is next placed in a solvent such as trichlorethylene and isopropanol in equal parts at boiling temperature. The action of the solvent relieves the diodes from the circuit or transfer plate 12 leaving them securely soldered to the conductors of the grid 16, as seen in FIG. 4.

Figure 5:
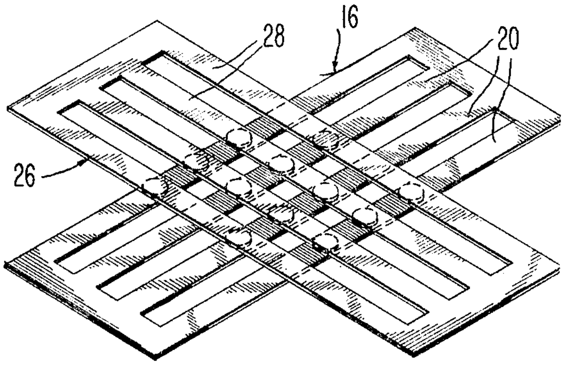
FIG. 5 illustrates an orthogonal array of two oppositely disposed grids bonded to interposed semi-conductors.

Thereafter a second similar conductor grid 26, FIG. 5, is provided having a desired solder coating and is disposed with its conductors 28 orthogonal to those of the conductors on the original grid 16. This assembly is then placed in the aforementioned jig or hot-plate and the diodes 14 are now soldered to the conductors of the upper grid 26.

The assembly of FIG. 5, as will be readily apparent to those skilled in the art, is an open work construction which thus permits the etching, washing, finishing and/or varnishing stages of the fabrication to be accomplished easily, simply and efficiently. The semi-conductor elements can be cleaned and polished by the etchant solutions which now are enabled to circulate all around each of the diodes and each of the cross connections in a manner formerly not possible due to the interfering top and bottom planes or plates and the interaction of the end products developed when the etchants first contact the diode forming material.

Figure 7:
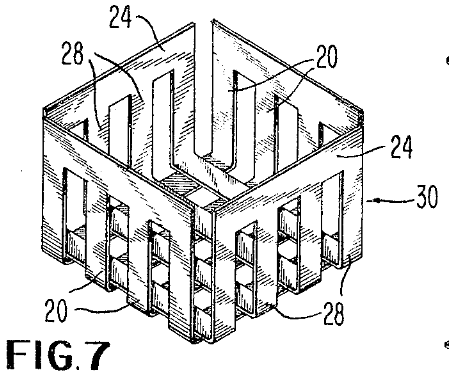
FIG. 7 is an isometric view of the basket type structure resulting from bonding the ends of the conductor grid perpendicularly to the plane of the diode array.
Figure 8:
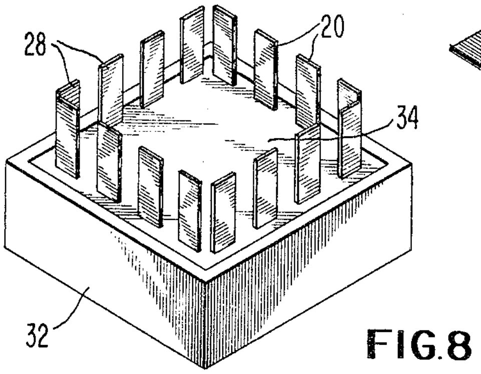
FIG. 8 is a bottom view of an electronic package produced by the present invention.

The ends of the conductors 20 and 28 are next bent at right angles to the plane of the diodes, FIG. 7, to form a basket-like subassembly 30, which is then placed within a box-like rectangular dielectric member 32—the latter forming a plastic container therefor. A silicone rubber cushioning compound is poured to a suitable level therein e.g., substantially filling the member 32. And finally, after this material has sufficiently set, over this is poured a dielectric epoxy 34 which is permitted to harden or cure. Lastly, the connecting metal portions 24 are cut away to leave the conductors 20, 28 exposed as seen in FIG. 8 thereby providing a rigid yet shock resistant unitary electronic assembly adapted for pluggable interconnection to a desired utilization device, as hereinafter described.

In connection with the foregoing arrangement it is seen that the present method has certain decided advantages over other known methods including ease in making connection to the diodes, thus eliminating a need for wrap-around connections or plated through hole techniques. Etching is simple and efficient due to the open structure wherein washing, potting, etc. are made to be similarly easy. Potting for example, can be performed without concern for stresses between circuit board and potting compound during pouring, curing etc., since the silicone rubber compound substantially fills the major portion of the container space while the relatively thin layer of dielectric epoxy rigidifies the projecting conductors thereby enabling them to withstand handling, shock, stresses and strains in use and or package replacement. Silver can be plated instead of soldered so that a high temperature device results therefrom. With the foregoing type of construction a forty or ninety diode package could occupy about three-quarters of an inch by three-quarters of an inch, standing approximately one quarter of an inch high.

The foregoing construction however, by its very nature is not only exceedingly small, but before potting may also be relatively flimsy due to the thickness of the supporting elements involved. Thus there may be a danger of a connection coming loose from a diode or of a conductor lifting away from the diode or of the actual silicon bond separating or the silicon may actually break in two, under the tremendous strains and high forces acting between the two joints when pressure is placed on the soldered conductors during handling (in the order of 1500 pounds per diode for an applied force of one pound on the wire conductors).

The structure illustrated in FIGS. 9 through 12 avoids these and other problems and limitations in a novel manner. A dielectric supporting panel 36 of glass, glass epoxy or similar material is provided with a plurality of conductors 38 and 40 which may be screened or otherwise provided thereon. The ends 42 of busses 38 are disposed at right angles to the remainder thereof for purposes which will become more clear hereinafter. A plurality of short conductor pads 44 are disposed on the right side of the panel 36 and aligned with the ends 42 of conductors 38. A diode circuit plate structure such for example as that shown in FIG. 2, is assembled over the conductors 40, as before, and the diodes 14′ are then soldered thereto in the fashion hereinabove described. The assembly is then immersed in solvents to remove the transfer plate leaving the diodes attached to the conductors 40 as seen in FIG. 9.

Thereafter a solder coated wire grid 45 including a plurality of conductors 46 similar to grid 16, FIG. 1, is orthogonally arranged over the original conductors 40 and diodes 14′ and soldered thereto as earlier described. One end 48 of each conductor 46 is attached to the portion 42 of respective conductors 38 while the opposite end 50 of each grid conductor 46 is bent down as at 51, FIG. 11, to meet an associated strain relief pad 44 on the right side of the glass epoxy panel to which it is secured as by soldering. In this arrangement there are no mechanical requirements of support at the point of attachment of diode 14′ with associated conductors 46. This area is simply and only an electrical contact point. The upper grid conductors 46 pick up the tops of all of the diodes 14′ and thereafter are attached to the aforementioned strain relief pads 44, thereby resulting in a distributed force back to the diodes. The conductors 38 and 40 are or may be applied to the substrate with an adhesive that can withstand soldering temperatures and thus they will not fracture or fail in use. As seen particularly in FIG. 12, the foregoing arrangement can be potted into a unitary package or assembly 54 in which all of the conductors 38 and 40 are brought out to one edge 56 of the assembly thereby producing a pluggable electronic package which is demountably receivable in commercially available printed circuit connectors (not shown).

Referring now particularly to FIGS. 13 through 17, there is shown a semi-conductor circuit arrangement in which one or more transistor type semi-conductors are employed in a novel array thereby to provide electronic circuitry, e.g., for use with vacuum tube indicating apparatus, as will be brought out more particularly hereinafter.

Figure 13:
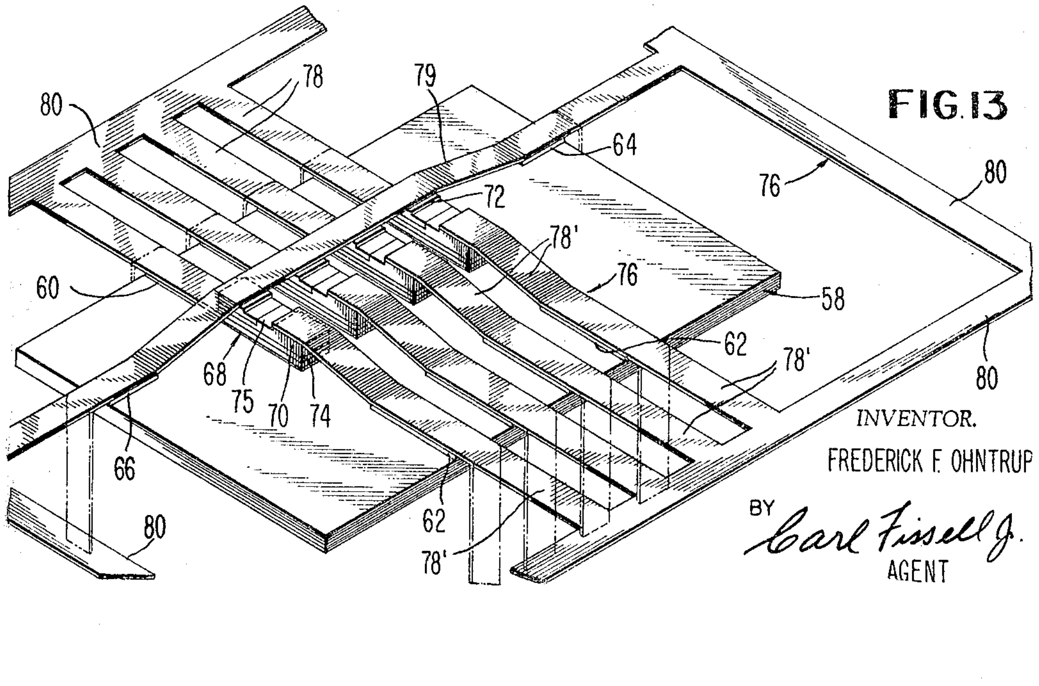
FIG. 13 is an isometric view of a semi-conductor circuit arrangement disposed on a dielectric panel board and illustrating the various interconnections provided by a conductive grid overlaid thereon.

A circuit plate 58, FIG. 13, of dielectric material, such as glass epoxy, is provided with a plurality of circuit lines or conductors 60 which may have been printed, screened, etched or otherwise provided thereon and which have been given a solder plating or coating, not shown. The circuit lines 60 are disposed in parallel side by side arrangement transverse to the longer dimension of the circuit plate 58. Alternatively, the base supporting structure may of course be copper clad phenolic, glass epoxy or a printed circuit board having solid conductor busses thereon, or the conductors could be copper wires which have been solder plated and applied to the circuit board. The edge of the board opposite to the busses 60 is provided with a plurality of conductive strain relief pads 62 aligned with the conductors 60. On opposite ends of the plate 58 arranged perpendicular to conductors 60 and 62 are pads 64 and 66—one at either end of the circuit board 58.

Figure 14:
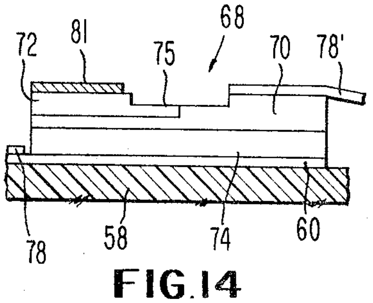
FIG. 14 is a partial cross sectional view of one of the semi-conductor elements of FIG. 13.

A plurality of semi-conductor devices, in this case transistor 68, of the type shown in FIG. 14, having a base 70, an emitter 72 and a collector 74, fabricated in a manner generally according to the teaching of the copending application Serial No. 189,759, filed April 24, 1962, now Patent No. 3,187,403 in the name of Frederick F. Ohntrup, entitled Method of Making Semiconductor Circuit Elements assigned to the same assignee as the present invention, and arranged on a substrate wafer or plate, not shown, are located on respective conductors 60 on the left side of the circuit plate 58. A single transistor 68 is disposed on and parallel with each conductor 60 and a solder connection is then made between the collector 74 and the conductor 60. Each collector is now located on a conductor 60 such that the emitter is to the left and the base is to the right, as seen more particularly in FIG. 14. For purposes to be explained hereinafter, the center section 75 of the transistor is cut away slightly as by etching. A one piece grid 76, FIG. 13, of metal such as nickel, fabricated as hereinbefore described, is seen to include oppositely disposed confronting rows of parallel spaced apart conductors 78 and 78' separated by a single perpendicularly disposed conductor 79 extending transversely therebetween. The conductors 78, 78' and 79 are peripherally joined at one end by means of the edge or border material 80.

Figure 15:
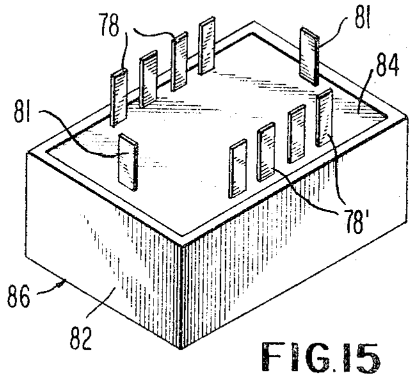
FIG. 15 is an isometric illustration of the electronic assembly of FIG. 13 after final bending, cutting and potting.

The grid 76 is overlaid on the board 58 so that the conductors 79, 78' contact with the tops of the transistors and 78 with the bottoms thereof so as to connect conductors 78 to respective collector busses 60. Conductors 78' interconnect the base 70 of each transistor to its respective strain relief conductor 62 extending on the right side of the circuit plate. The single conductor buss 81, the ends of which are shown projecting vertically upwardly in FIG. 15, is oriented at right angles to the other conductors 78 and 78' contacts and interconnects the single pads 64 and 66 with each of the emitters 72 thereby forming a common emitter line for all of the transistors on the board 58. With the foregoing arrangement the grid can make as many as thirty connections at one time. For the sake of clarity only four transistors and associated wiring interconnections are shown in FIG. 13. However, it is to be understood that any number of transistors and associated interconnections can be fabricated in the manner aforedescribed. Once all of the electrical solder connections have been made the excess metal 80 is removed leaving the horizontally extending conductors for further handling.

So as to aid in subsequent etching and in order to reduce the concentration of the two material types in this area thereby providing a good base-emitter diode the area 75 of each transistor is etched away for a slight prescribed depth.

The transistor is approximately seventy-five mils in overall length and about twenty-five mils wide. The projecting ends of conductors 78, 78' are now bent perpendicularly to the plane of the assembly as shown by the broken lines, FIG. 13, after which the assembly is etched, cleaned and made ready for the final potting step.

As with the diode package hereinbefore described, a dielectric member such as the rectangular box-like structure 82 is or may be provided into which a quantity of silicone rubber is poured to form a cushion, not shown. The semi-conductor assembly is then inverted and placed within the member 82 after which the remaining space therewithin is filled with a dielectric potting compound such as epoxy 84 thereby to form the module leaving the ends of the leads 78, 78' and 81 exposed. It should at once be apparent that the structure 86 is adaptable for pluggable interconnection to other associated circuitry by means of printed wiring panels, printed circuit connectors and the like.

Figure 17:
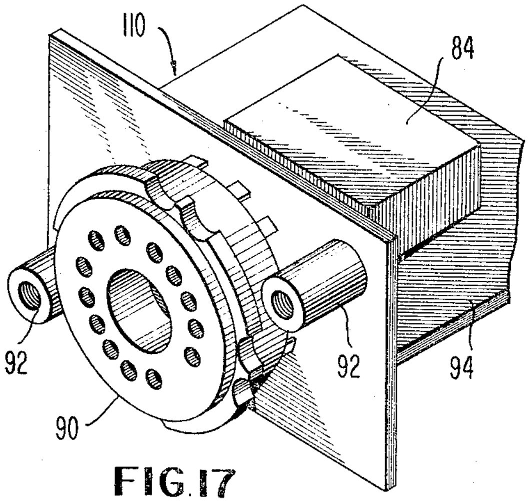
Figure 16:
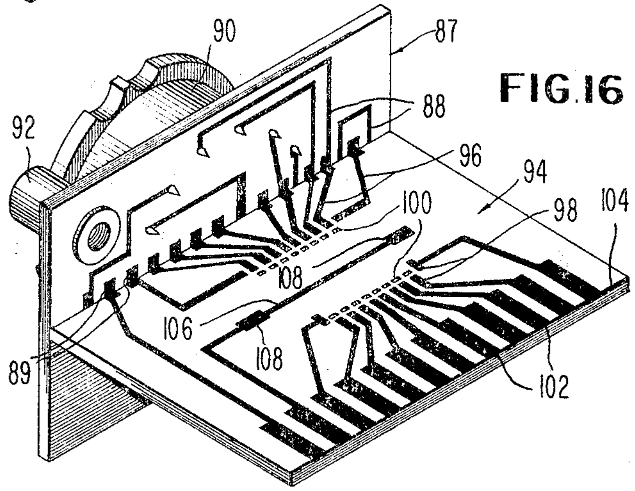
FIG. 16 is an isometric view of electrical circuit assembly for use with an indicating tube illustrating the printed wiring conductors and contacts to which the assembly of FIG. 15 is or may be electrically attached; and, FIG. 17 is an isometric view of a unitary electronic assembly provided by the present invention.

One application, among others, wherein such pluggable modules are useful is as electronic drivers for electronic indicating tubes. A structure employing such circuitry is shown in FIGS. 16 and 17 wherein there is illustrated a dielectric panel board 87 including a plurality of conductors 88 and pads 89 applied thereto in known fashion together with a tube base or socket 90 and a pair of diagonally oppositely disposed stand off member 92 for supporting the structure on an associated panel or rack of equipment.

Disposed at right angles to panel 87 is a dielectric panel 94 which may be attached thereto by a tongue and groove technique or in some other suitable manner. Panel 94 is provided with a plurality of electrical conductors 96 and pads 98 thereon and oppositely disposed rows of through holes 100 for receiving the conductors 78, 78' and 81 of the module 86. A plurality of electrical input pads 102 are arranged in parallel spaced apart relation along the free edge 104 of the panel 94 and are connected to the hole pads 98. The busses 96 are connected to terminal pads 89 which are or may be soldered or otherwise electrically interconnected to the busses 88 on panel 87. A common buss or conductor 106 with pads 108 is provided for the contacts 81. From the foregoing it can be seen that the module 86 can be simply pluggably mounted on the panel 94, from the opposite side in FIG. 16 and the contacts 78, 78' and 81 bent over and soldered to the pads 98 and 108 thereby to provide a unitary assembly which when supplied with the indicator or other vacuum tube becomes a demountable, pluggable assembly 110 for use in a variety of electronic applications. Should the unit 110 become defective it can be readily removed and quickly and easily replaced with a new unit thereby saving both time and money.

What is claimed is:

1. The method of fabricating semiconductor circuit assemblies comprising the steps of:

(a) providing a dielectric supporting member with a plurality of discrete parallel conductors and other conductors arranged in a repeating discontinuous pattern adjacent an edge portion of said dielectric supporting member thereby providing a strain relief build-up for conductors which are to be attached thereto, (b) registering a plurality of semiconductors on certain ones of said parallel conductors in a desired pattern, (c) conductively bonding said semiconductors to the conductors of said dielectric member while so registered, (d) orthogonally registering a conductive element of a self-supporting conductive grid with the conductors bearing said semiconductors so that the element of said conductive grid extends at right angles to the conductors of said dielectric member, and in alignment with said strain relief forming conductors and meeting the latter conductors at a slight depthwise angle thereto, (e) conductively bonding said semiconductors to the conductors of said grid and to said strain relief conductors so that the forces developed in connecting said assembly to a receptacle are distributed over said strain relief conductors and are not transmitted to said semiconductors, and (f) encapsulating said assembly but leaving the ends of certain of said conductors of said dielectric member exposed for interconnection to a utilization device.

2. The method of fabricating semiconductor electrical circuit modules comprising the steps of:

(a) providing a dielectric member with a plurality of discrete electrical conductors thereon, certain of said conductors being disposed in parallel, spaced apart, confronting rows, and others of said conductors being disposed at right angles to said rows of conductors and including strain relief build-up members for conductors to be attached thereto, (b) conductively bonding an individual semiconductor to a conductor of each of said rows of conductors on said dielectric member, (c) providing a substantially self-supporting conductive grid including oppositely disposed confronting rows of parallel, spaced apart conductors separated by a conductor extending between said rows at right angles thereto, (d) registering the conductive elements of said grid with the conductors of said dielectric member and with said semiconductors so that one row of conductive elements of said grid is in electrical contact with the conductive elements of a similar disposed row of dielectric conductors and the other row of conductive elements of said grid is in electrical contact with the conductive elements of the opposite row of dielectric conductors while the grid conductor disposed at right angles to the row conductors forms a common electrical contact with the semiconductors and the similarly right angularly disposed dielectrical conductors the ends of certain of said conductive elements of said grid being aligned with and contacting the strain relief build-up members at a slight depthwise angle thereto, (e) conductively bonding the conductors of said grid to said semiconductors and to the conductors of said dielectric member while so registered, (f) removing the end portion of said grid conductors to leave a projection of each remaining thereby to enable the resulting structures to be pluggably receivable within the female receptacle of a utilization device and encapsulating said structure.

3. The method of fabricating semiconductor electrical circuit modules comprising the steps of:

(a) providing a dielectric member with a plurality of discrete electrical conductors thereon, certain of said conductors being disposed in parallel, spaced apart, confronting rows and other of said conductors being disposed at right angles to said rows of conductors certain of said conductors arranged adjacent to an edge of said dielectric member and providing strain relief members for the attachment of other conductors thereto, (b) conductively bonding an individual semiconductor to each conductor of one of said rows of conductors on said dielectric member, (c) providing a substantially self-supporting conductive grid including oppositely disposed discontinuous rows of parallel, spaced apart conductive elements separated by a conductor extending between said rows and at right angles thereto, (d) registering the conductive elements of said grid with the conductors of said dielectric member and with said semiconductors so that one row of elements of said grid is in electrical contact with the conductors of a similarly disposed row of dielectric conductors and the other row of elements of said grid is in electrical contact with the conductors of the opposite row of dielectric conductors while the grid conductor disposed at right angles to the row conductors forms a common electrical contact with the semiconductors and the similarly right angularly disposed dielectrical conductors certain of said conductive elements of said grid being aligned with and contacting said strain relief members at a slight depthwise angle thereto, (e) conductively bonding the conductive elements of said grid to said semiconductors and to the conductors of said dielectric member while so registered, (f) bending portions of the conductive elements of said grid at right angles to the plane of said dielectric member, (g) encapsulating the dielectric member, and (h) finally, removing the end portion of said grid conductive elements to leave a projection of each remaining thereby to enable the resulting assembly module to be pluggably receivable within the female receptacle of a utilization device.

4. The method of fabricating semiconductor circuit modules comprising the steps of:

(a) providing a dielectric supporting member with oppositely disposed confronting rows of discrete parallel, spaced apart electrical conductors including orthogonally disposed conductive attachment strain relief pads, (b) providing a plurality of semiconductors each of which includes a plurality of points of attachment, (c) conductively bonding individual semiconductors by means of a first point of attachment to respective conductors of one of said rows of conductors on said dielectric member, (d) providing a self-supporting conductive grid including oppositely disposed confronting rows of parallel, spaced apart conductive elements separated by a conductor disposed therebetween at right angles to said rows of conductors, (e) conductively connecting one of the rows of conductive elements of said grid to the conductors on one of the rows of conductors on said dielectric member and connecting the other of the rows of conductive elements of said grid to another of the points of attachment of said semiconductor and to said other row of conductors on said dielectric member and meeting certain of the dielectric row conductors at a slight depthwise angle thereto and connecting said orthogonal conductor of said grid to still other points of attachment on said semiconductors, (f) bending the unattached portions of the conductive elements of said grid at right angles to the plane of said dielectric member, and (g) dielectrically encapsulating said dielectric member leaving exposed the ends of said conductive elements for attachment to suitable utilization apparatus.

References Cited by the Examiner

UNITED STATES PATENTS

| | | | |
|---|---|---|---|
| 2,872,664 | 2/1959 | Minot | 317—101 |
| 2,902,628 | 9/1959 | Leno | 317—101 |
| 2,915,686 | 12/1959 | Schubert | 317—101 |
| 2,994,121 | 8/1961 | Shockley | 29—25.3 |
| 3,039,177 | 6/1962 | Burdett | 29—155.5 |
| 3,158,927 | 12/1964 | Saunders | 29—155.5 |

FOREIGN PATENTS

| | | |
|---|---|---|
| 145,089 | 2/1952 | Australia. |
| 750,244 | 6/1956 | Great Britain. |

CHARLIE T. MOON, *Primary Examiner.*

JOHN F. CAMPBELL, *Examiner.*

J. W. BOCK, W. I. BROOKS, *Assistant Examiners.*